United States Patent
Lou et al.

(10) Patent No.: US 8,760,796 B1
(45) Date of Patent: Jun. 24, 2014

(54) REDUCING ACOUSTIC NOISE IN A DISK DRIVE WHEN EXITING IDLE MODE

(75) Inventors: Mingji Lou, Corona, CA (US); Orhan Beker, Aliso Viejo, CA (US); Jenghung Chen, Cupertino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 312 days.

(21) Appl. No.: 13/153,282

(22) Filed: Jun. 3, 2011

(51) Int. Cl.
G11B 5/596 (2006.01)

(52) U.S. Cl.
USPC ..................................... 360/78.04; 360/78.14

(58) Field of Classification Search
None
See application file for complete search history.

(56) References Cited

U.S. PATENT DOCUMENTS

| | | |
|---|---|---|
| 5,291,110 A | 3/1994 | Andrews, Jr. et al. |
| 5,465,034 A | 11/1995 | Andrews, Jr. et al. |
| 5,475,545 A | 12/1995 | Hampshire et al. |
| 5,901,009 A | 5/1999 | Sri-Jayantha et al. |
| 5,963,392 A * | 10/1999 | Sri-Jayantha et al. .......... 360/75 |
| 6,013,995 A | 1/2000 | Kim |
| 6,018,432 A | 1/2000 | Ukani |
| 6,396,653 B1 * | 5/2002 | Haines et al. .................... 360/75 |
| 6,757,481 B1 | 6/2004 | Nazarian et al. |
| 6,762,571 B2 | 7/2004 | Min et al. |
| 7,289,291 B1 | 10/2007 | Schlumberger |
| 7,359,140 B2 | 4/2008 | Chung |
| 7,619,849 B2 | 11/2009 | Uchida et al. |
| 7,660,070 B2 | 2/2010 | Frisby et al. |

OTHER PUBLICATIONS

T. Yamaguchi, K. Shishida, H. Hirai, K. Tsuneta, M. Sato, "Improvement of Servo Robustness for Digital Sector Servo System", IEEE Transactions on Magnetics, Sep. 1992, pp. 2910-2912, vol. 28, No. 5.

* cited by examiner

Primary Examiner — Andrew L Sniezek

(57) ABSTRACT

A disk drive is disclosed comprising a head actuated over a disk comprising a plurality of tracks, wherein each track comprises a plurality of servo sectors. When entering an idle mode, the head is floated over the disk, and when exiting the idle mode, a radial velocity of the head is measured, a seek distance is determined in response to the radial velocity, and a seek operation seeks the head the seek distance to a first track.

10 Claims, 5 Drawing Sheets

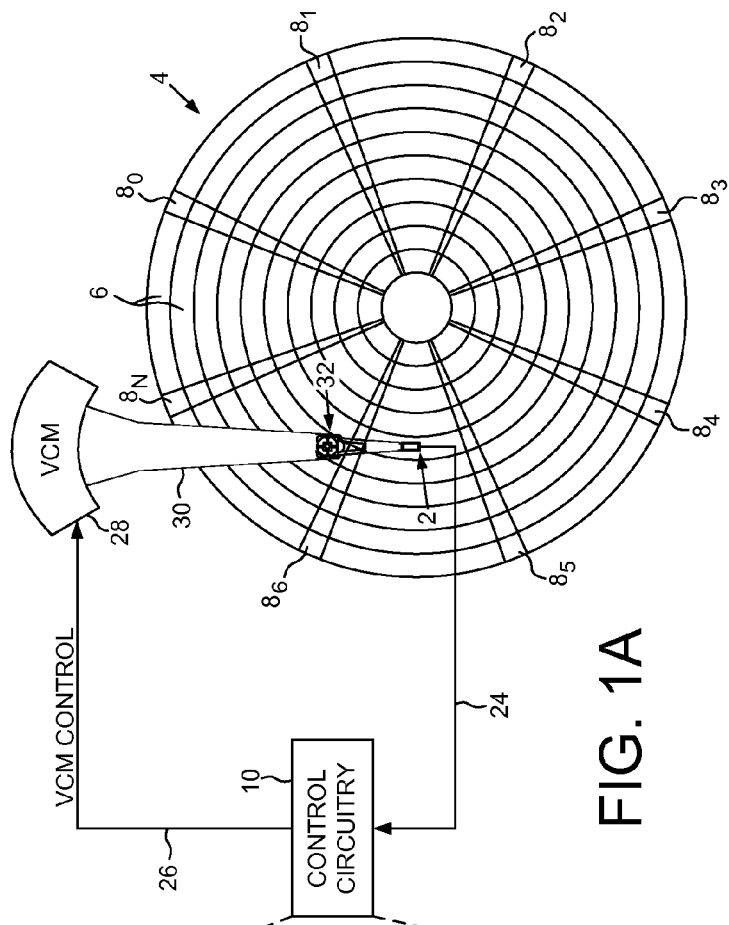
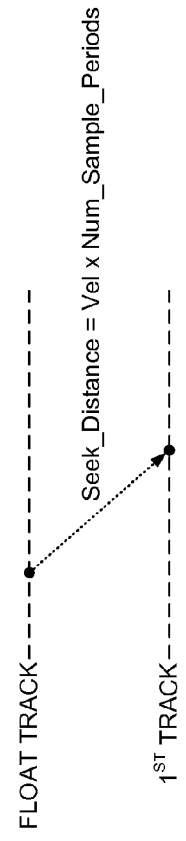
FIG. 1A
FIG. 1B
FIG. 1C

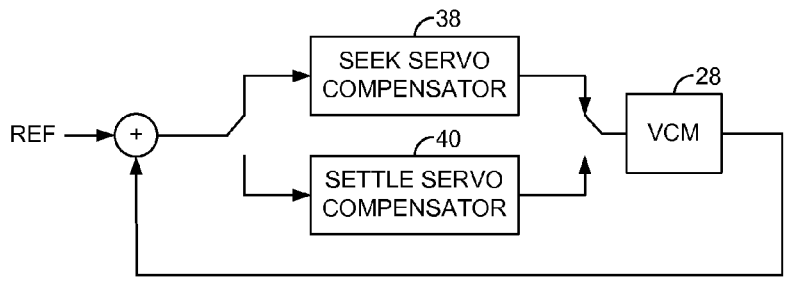
FIG. 3A
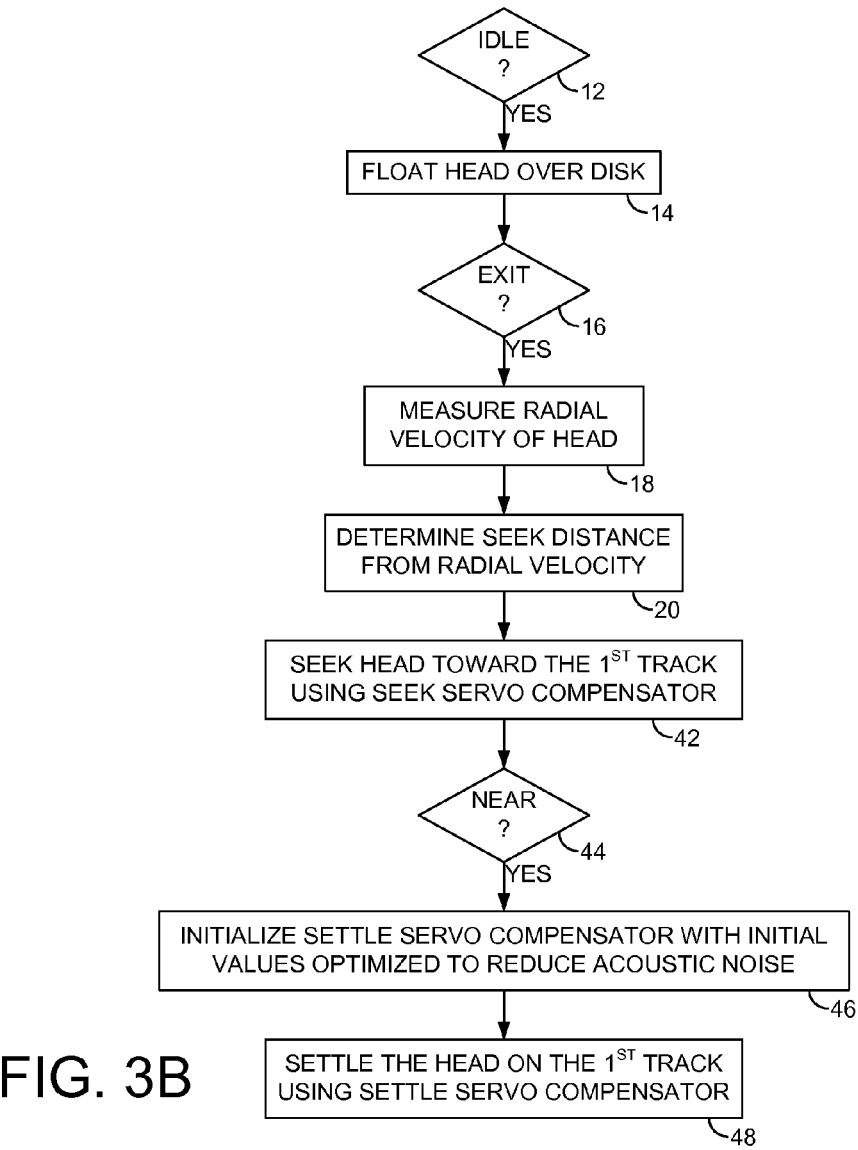
FIG. 3B
$$J = \sum_{k=0}^{\infty} X(k)^T \cdot Q \cdot X(k)$$
FIG. 3C

REDUCING ACOUSTIC NOISE IN A DISK DRIVE WHEN EXITING IDLE MODE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Acoustic noise may be a significant concern when designing a disk drive, particularly for certain consumer applications, such as digital video recorders. If a disk drive frequently enters an idle mode, there may be acoustic noise generated when exiting the idle mode. Accordingly, it is desirable to modify operation of a disk drive in order to reduce the acoustic noise caused by exiting an idle mode.

BRIEF DESCRIPTION OF THE DRAWINGS

FIG. 1A shows a disk drive according to an embodiment of the present invention comprising a head actuated over a disk.

FIG. 1B is a flow diagram according to an embodiment of the present invention wherein when entering an idle mode the head is floated over the disk, and when exiting the idle mode a radial velocity of the head is measured and used to determine a seek distance to a first track.

FIG. 1C illustrates an embodiment of the present invention wherein the seek distance is determined based on a predetermined number of servo sectors expected to be crossed during the seek (i.e., based on an expected time to execute the seek from the float track to the first track).

FIG. 3A shows an embodiment of the present invention wherein the disk drive comprises a seek servo compensator and a settle servo compensator.

FIG. 3B is a flow diagram according to an embodiment of the present invention wherein the settle servo compensator is initialized with values optimized to reduce acoustic noise.

FIG. 3C shows an equation for computing a performance index according to an embodiment of the present invention wherein Q is a weighting matrix optimized to reduce acoustic noise.

DETAILED DESCRIPTION OF EMBODIMENTS OF THE INVENTION

Figure 2:
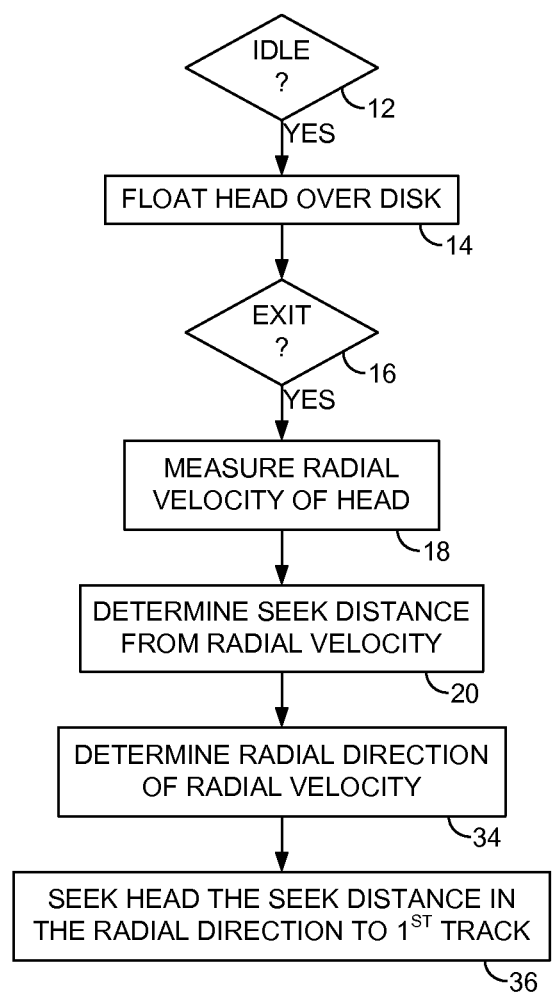
FIG. 2 is a flow diagram according to an embodiment of the present invention wherein the seek distance to the first track is determined based on the direction of the measured radial velocity (i.e., toward an inner or outer diameter of the disk).

FIG. 1A shows a disk drive according to an embodiment of the present invention comprising a head 2 actuated over a disk 4 comprising a plurality of tracks 6, wherein each track comprises a plurality of servo sectors $8_0$-$8_N$. The disk drive further comprises control circuitry 10 operable to execute the flow diagram of FIG. 1B, wherein when entering an idle mode (step 12), the head is floated over the disk (step 14), and when exiting the idle mode (step 16), a radial velocity of the head is measured (step 18), a seek distance is determined in response to the radial velocity (step 20), and a seek operation seeks the head the seek distance to a first track (step 22).

In the embodiment of FIG. 1A, the control circuitry 10 processes a read signal 24 emanating from the head 2 to demodulate the servo sectors $8_0$-$8_N$ into one or more estimated states of a servo system (e.g., velocity or position). The estimated state is compared to a target state to generate an error signal that is filtered with a suitable servo compensator to generate a control signal applied to an actuator, such as a current 26 applied to a voice coil motor 28 which rotates an actuator arm 30 about a pivot in order to actuate the head 2 radially over the disk 4 during seek, settle, and tracking operations. In some embodiments, the disk drive may also utilize a microactuator for assisting the settle and tracking operations, such as a piezoelectric (PZT) microactuator 32 that actuates a suspension coupled to a distal end of the actuator arm 30.

When the disk drive enters an idle mode (e.g., when not servicing access commands), the servo system for actuating the head over the disk may be disabled in order to conserve power. In one embodiment, while the servo system is disabled the head essentially floats over the disk surface. When the disk drive exits the idle mode (e.g., to service an access command), the control circuitry seeks the head to a first track, and then seeks the head to a second track corresponding to the access command. The multiple seeks performed when exiting the idle mode may result in undesirable acoustic noise. Accordingly, in the embodiments of the present invention the servo system is modified in order to reduce acoustic noise when exiting the idle mode.

In one embodiment, when exiting the idle mode a first seek operation seeks the head from its initial floating position to a first track, and then a second seek operation seeks the head from the first track to a target track of the next access command. In order to reduce the acoustic noise, the seek distance for the first seek operation is determined based on a measured radial velocity of the head when exiting the idle mode. For example, in one embodiment the seek distance of the first seek operation is proportional to the radial velocity of the head so that the faster the head is moving immediately after exiting the idle mode the longer the seek distance to the first track. This embodiment may help reduce acoustic noise by limiting the deceleration of the head toward the first track.

FIG. 1C shows an embodiment of the present invention wherein the seek distance from the initial float track to the first track is determined based on the radial velocity of the head and a number of sample periods designated to perform the first seek operation (seek time). In one embodiment, the number of sample periods corresponds to a number of servo sectors the head will pass over during a predetermined time interval corresponding to the designated seek time. The number of servo sectors the head will pass over during the predetermined time interval depends on the rotational velocity of the disk. The radial velocity of the head is measured in terms of a number of tracks the head will cross in a single sample period (single servo wedge), such that the seek distance is computed by multiplying the radial velocity of the head by the number of sample periods designated for the first seek operation. In one embodiment, the radial velocity of the head is determined by measuring a number of tracks crossed per servo wedge when exiting the idle mode. Other embodiments may estimate the radial velocity of the head based on a back electromotive force (BEMF) voltage generated by the voice coil of the VCM 28 which is proportional to the radial velocity of the head.

FIG. 2 is a flow diagram which extends on the flow diagram of FIG. 1B, wherein in addition to determining the radial velocity of the head (step 20) a radial direction of the head is determined when exiting the idle mode (step 34). The control circuitry then seeks the head in the same radial direction as the initial radial direction of the head (step 36). That is, the control circuitry determines the seek distance based on the radial velocity of the head, and then determines the first track to seek to based on the radial direction of the head. For example, if the head is initially moving toward the inner diameter of the disk, the first track to seek to is selected toward the inner diameter of the disk away from the head, whereas if the head is initially moving toward the outer diameter of the disk, the first track to seek to is selected toward the outer diameter of the disk away from the head. In this manner, the control circuitry decelerates the head toward the first track without needing to reverse direction.

Figure 3D:
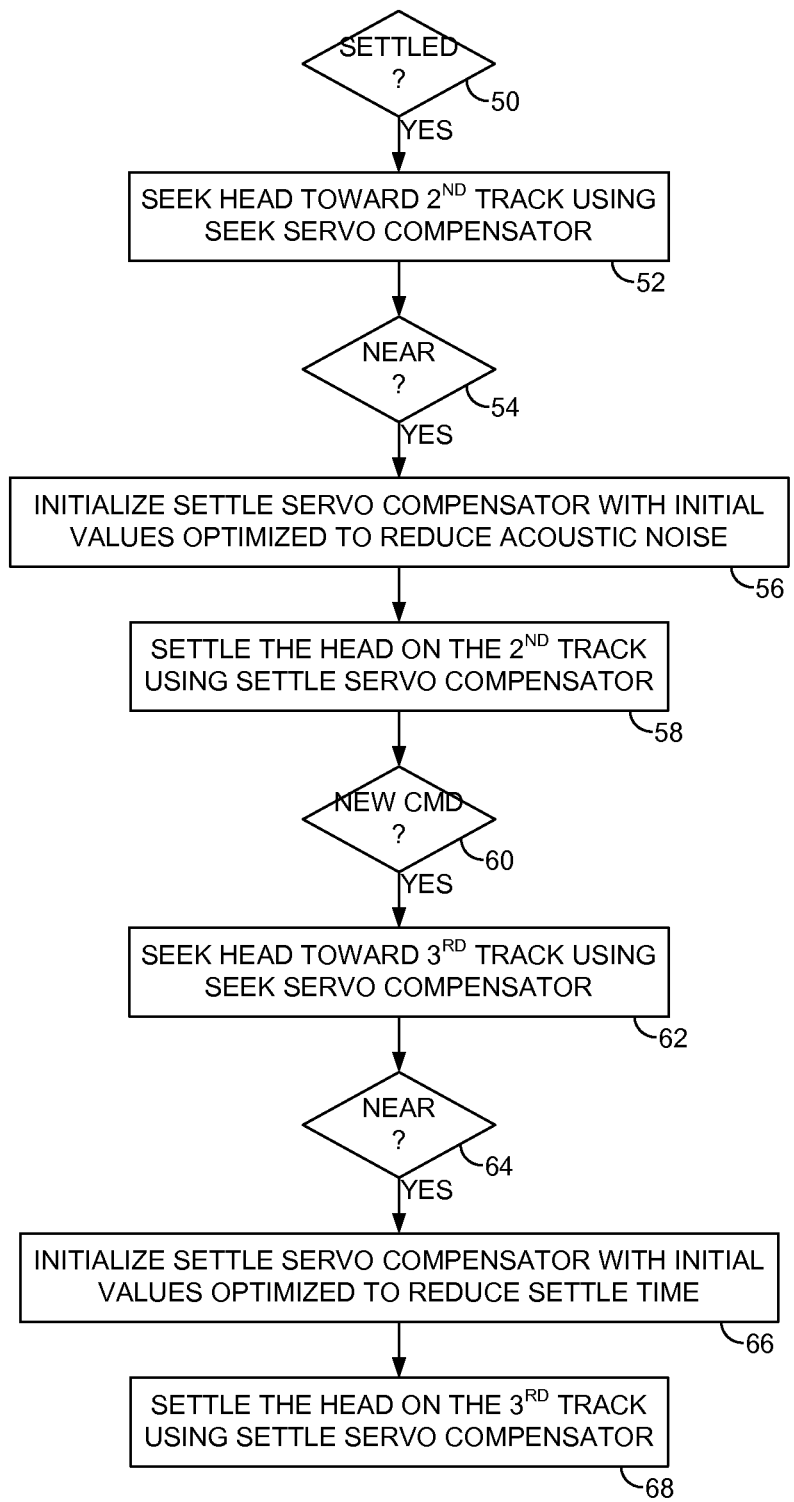
FIG. 3D is a flow diagram according to an embodiment of the present invention wherein the settle servo loop is initialized with values optimized to reduce acoustic noise when seeking from the first to the second track, and then initialized with values optimized to reduce the settle time when seeking from the second to a third track.

FIG. 3A shows an embodiment of the present invention wherein the servo loop for actuating the head over the disk comprises a seek servo compensator 38 used during seek operations, and a settle servo compensator 40 used during settle operations, wherein when exiting the idle mode the settle servo compensator is initialized with values that reduce acoustic noise. This embodiment is understood with reference to the flow diagram of FIG. 3B wherein after determining the seek distance to the first track (step 20) the control circuitry seeks the head toward the first track using the seek servo compensator (step 42). When the head approaches the first track (step 44), the control circuitry initializes the settle servo compensator with values optimized to reduce acoustic noise (step 46), and then settles the head onto the first track using the settle servo compensator (step 48). The settle servo compensator may be initialized with the initial values at any suitable time, such as during the seek operation, or just after switching to the settle operation.

The initial values that help reduce acoustic noise for the settle servo compensator may be generated in any suitable manner, and in one embodiment, the initial values may be generated based on a performance index computed using the equation of FIG. 3C. Further details concerning the equation of FIG. 3C are disclosed in the technical article by T. Yamaguchi, et al., "IMPROVEMENT OF SERVO ROBUSTNESS FOR DIGITAL SECTOR SERVO SYSTEM", IEEE Transactions on Magnetics, Vol. 28, No. 5, September 1992, the disclosure of which is incorporated herein by reference. In the aforementioned technical article, the Q weighting matrix for computing the performance index of FIG. 3C is optimized to reduce the settle time of the settle operation (improve settle performance). In an embodiment of the present invention, the Q weighting matrix for computing the performance index of FIG. 3C is optimized to reduce acoustic noise of the settle operation (improve acoustic performance). In one embodiment, a number of different Q weighting matrices may be generated corresponding to different seek profiles, wherein the seek profile may be selected based on the initial radial velocity of the head and the seek distance to the first track.

In one embodiment, the settle servo compensator is initialized with values that reduce acoustic noise during at least the first two seeks performed after exiting the idle mode. This embodiment is understood with reference to the flow diagram of FIG. 3D wherein after settling the head onto the first track (step 50) using initial values that reduce acoustic noise, the control circuitry seeks the head toward a second track (corresponding to an access command) using the seek servo compensator (step 52). When the head approaches the second track (step 54), the control circuitry initializes the settle servo compensator using values that reduce acoustic noise (step 56) and then settles the head onto the second track using the settle servo compensator (step 58). When a new access command is received (step 60), the control circuitry seeks the head toward a third track using the seek servo compensator (step 62). When the head approaches the third track (step 64), the control circuitry initializes the settle servo compensator using values that reduce the settle time (step 66) and then settles the head onto the second track using the settle servo compensator (step 68). In one embodiment, the Q weighting matrix described above with reference to FIG. 3C may be optimized to reduce acoustic noise or reduce the settle time in the flow diagram of FIG. 3D.

Figure 4A:
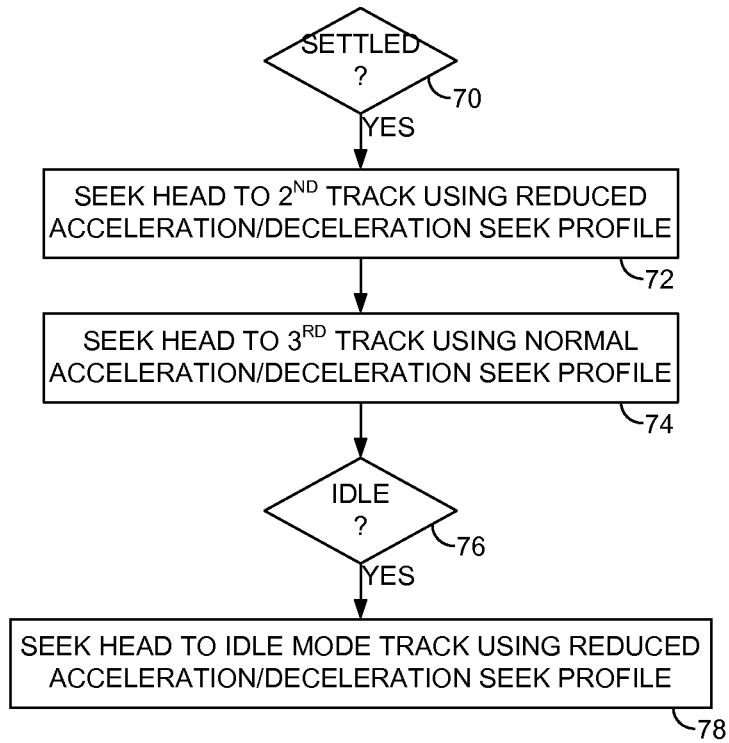
FIG. 4A is a flow diagram according to an embodiment of the present invention wherein a reduced acceleration/deceleration seek profile is used to seek the head from the first track to a second track in order to reduce acoustic noise.
Figure 4B:
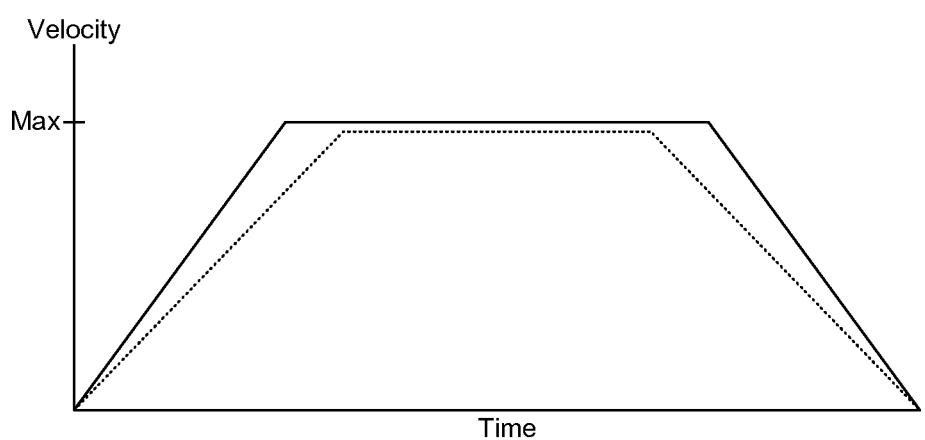
FIG. 4B illustrates a reduced acceleration/deceleration seek profile according to an embodiment of the present invention.

FIGS. 4A and 4B illustrate another embodiment of the present invention for reducing acoustic noise when exiting the idle mode, wherein after seeking to and settling on the first track (step 70), the control circuitry seeks the head from the first track to a second track (corresponding to a first access command) using a first idle mode seek profile (step 72), and then seeks the head from the second track to a third track (corresponding to a next access command) using a normal seek profile (step 74). The first idle mode seek profile comprises an acceleration/deceleration that is less than the acceleration/deceleration of the normal seek profile as illustrated in FIG. 4B which helps reduce acoustic noise when exiting the idle mode. In one embodiment, the maximum seek velocity of the first idle mode seek profile may also be less than the maximum seek velocity of the normal seek profile which may further reduce acoustic noise.

FIG. 4A also illustrates another embodiment of the present invention wherein when entering the idle mode (step 76), the control circuitry may seek the head to an idle mode track (prior to floating the head) using a second idle mode seek profile comprising an acceleration/deceleration less than that of the normal seek profile (step 78). The first idle mode seek profile may be the same or different from the second idle mode seek profile. Seeking to the idle mode track using reduced acceleration/deceleration helps reduce acoustic noise, particularly when the disk drive remains in the idle mode for a short duration. That is, modifying the servo system to reduce acoustic noise when entering the idle mode may help reduce acoustic noise associated with exiting the idle mode when the seek/settle operations are performed in close proximity due to a short idle time. In one embodiment, when entering the idle mode and settling on the idle mode track, the settle servo compensator is initialized with values that reduce acoustic noise similar to when exiting the idle mode as described above.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks, wherein each track comprises a plurality of servo sectors;
   a head actuated over the disk; and
   control circuitry comprising a servo control system to actuate the head over the disk, the control circuitry operable to:
      when entering an idle mode, disable the servo control system in order to float the head over the disk; and
      when exiting the idle mode:
         enable the servo system;
      measure a radial velocity of the head;
         determine a seek distance in response to the radial velocity; and
         seek the head the seek distance to a first track.

2. The disk drive as recited in claim 1, wherein the control circuitry is further operable to:
   determine a radial direction of the head corresponding to the radial velocity; and
   seek the head the seek distance in the radial direction to the first track.

3. The disk drive as recited in claim 1, wherein the control circuitry is further operable to determine the seek distance according to:

$$Vel \times Sample\_Periods$$

where:
   Sample_Periods is a number of servo sectors the head will pass over during a predetermined time interval; and
   Vel is a number of tracks crossed per Sample_Period.

4. The disk drive as recited in claim 1, wherein the control circuitry is further operable to:
   seek the head from the first track to a second track using a first idle mode seek profile; and
   seek the head from the second track to a third track using a normal seek profile,
   wherein at least one of an acceleration and deceleration of the first idle mode seek profile is less than an acceleration and deceleration of the normal seek profile.

5. The disk drive as recited in claim 4, wherein:
   when entering the idle mode the control circuitry is further operable to seek the head to an idle mode track using a second idle mode seek profile; and
   at least one of an acceleration and deceleration of the second idle mode seek profile is less than an acceleration and deceleration of the normal seek profile.

6. A method of operating a disk drive, the disk drive comprising a head actuated over a disk comprising a plurality of tracks, wherein each track comprises a plurality of servo sectors, the method comprising:
   when entering an idle mode, disabling a servo control system operable to actuate the head over the disk in order to float the head over the disk; and
   when exiting the idle mode:
      enabling the servo control system
      measuring a radial velocity of the head;
      determining a seek distance in response to the radial velocity; and
      seeking the head the seek distance to a first track.

7. The method as recited in claim 6, further comprising:
   determining a radial direction of the head corresponding to the radial velocity; and
   seeking the head the seek distance in the radial direction to the first track.

8. The method as recited in claim 6, further comprising determining the seek distance according to:

$$Vel \times Sample\_Periods$$

where:
   Sample_Periods is a number of servo sectors the head will pass over during a predetermined time interval; and
   Vel is a number of tracks crossed per Sample_Period.

9. The method as recited in claim 6, further comprising:
   seeking the head from the first track to a second track using a first idle mode seek profile; and
   seeking the head from the second track to a third track using a normal seek profile,
   wherein at least one of an acceleration and deceleration of the first idle mode seek profile is less than an acceleration and deceleration of the normal seek profile.

10. The method as recited in claim 9, wherein:
   when entering the idle mode further comprising seeking the head to an idle mode track using a second idle mode seek profile; and
   at least one of an acceleration and deceleration of the second idle mode seek profile is less than an acceleration and deceleration of the normal seek profile.

* * * * *